US007774420B2

(12) United States Patent
Keohane et al.

(10) Patent No.: US 7,774,420 B2
(45) Date of Patent: *Aug. 10, 2010

(54) MANAGING ON-DEMAND EMAIL STORAGE

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/143,789

(22) Filed: Jun. 22, 2008

(65) Prior Publication Data
US 2008/0256208 A1 Oct. 16, 2008

Related U.S. Application Data

(63) Continuation of application No. 10/834,496, filed on Apr. 29, 2004, now Pat. No. 7,406,505.

(51) Int. Cl.
*G06F 15/16* (2006.01)
*G06F 15/173* (2006.01)

(52) U.S. Cl. .................. 709/206; 709/223; 707/205
(58) Field of Classification Search .................. 709/206
See application file for complete search history.

(56) References Cited

U.S. PATENT DOCUMENTS

| 5,898,836 | A | 4/1999 | Freivald et al. | |
|---|---|---|---|---|
| 6,134,582 | A * | 10/2000 | Kennedy | 709/206 |
| 6,823,365 | B1 * | 11/2004 | Mattis et al. | 709/206 |
| 6,941,304 | B2 | 9/2005 | Gainey et al. | |
| 7,155,633 | B2 | 12/2006 | Tuma et al. | |
| 7,228,383 | B2 | 6/2007 | Friedman et al. | |
| 2002/0147733 | A1 | 10/2002 | Gold et al. | |
| 2003/0166399 | A1 * | 9/2003 | Tokkonen et al. | 455/419 |

(Continued)

OTHER PUBLICATIONS

"On Demand Solutions from HP", copyright 2003, available at http://www.hp.com/hps/ondemand/od_tiered.html as on Feb. 17, 2004.

*Primary Examiner*—Ashok B Patel
*Assistant Examiner*—Lawrence Cosby
(74) *Attorney, Agent, or Firm*—Matthew W. Baca; Amy J. Pattillo

(57) ABSTRACT

A method, system, and program for managing on-demand email storage are provided. An email service provider allocates a predetermined amount of storage space to an intended recipient. When an email is received for the intended recipient at the email service provider, the email service provider determines whether the predetermined storage space has sufficient capacity for storage of the email. If the predetermined storage space is insufficient for storage of the email, then the email service provider allocates on-demand storage space to the intended recipient. The email service provider then stores the email in the on-demand storage space, such that the email is stored, rather than discarded, when the predetermined storage space reaches full capacity. Before allocating on-demand storage space, the email service provider may compare the email characteristics with predefined criteria set by the intended recipient for emails to be stored in on-demand storage space.

7 Claims, 4 Drawing Sheets

U.S. PATENT DOCUMENTS

2003/0172118 A1    9/2003  Bilansky et al.
2004/0193824 A1*   9/2004  Johnson .................... 711/170
2005/0038862 A1*   2/2005  Keohane et al. ............ 709/207
2005/0216588 A1    9/2005  Keohane et al.

* cited by examiner

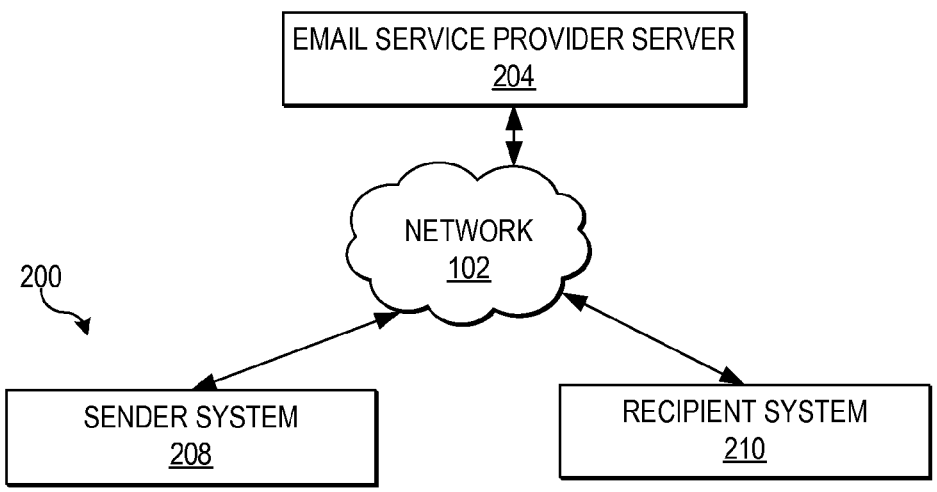
Fig. 2
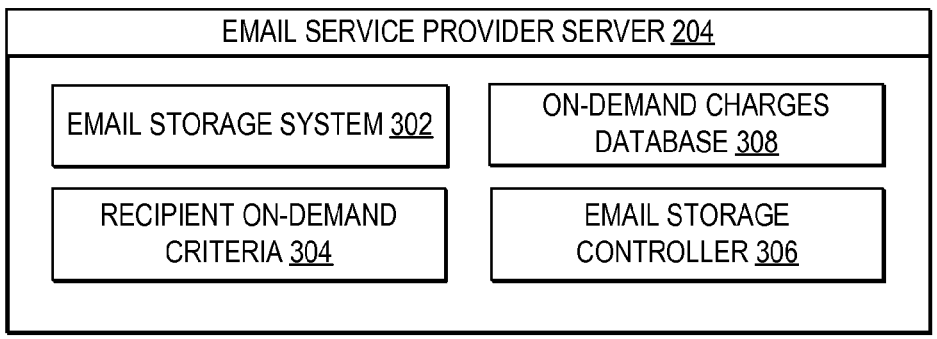
Fig. 3
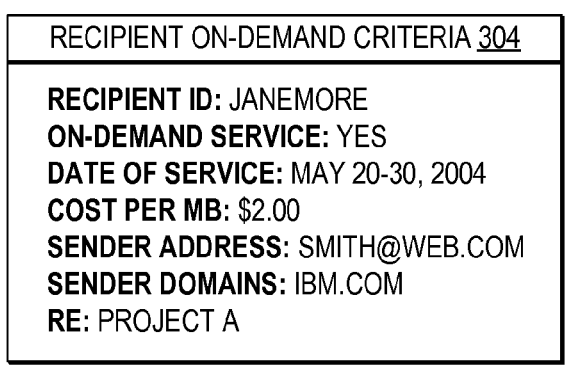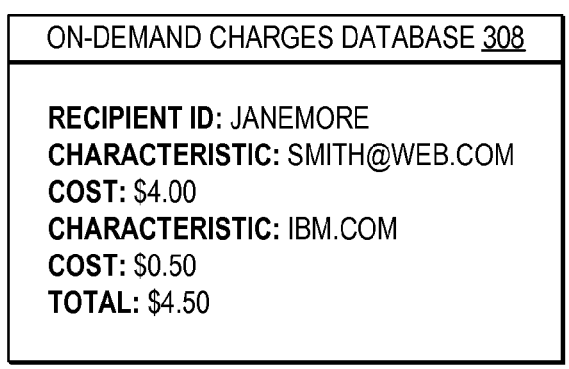
Fig. 4                Fig. 5

MANAGING ON-DEMAND EMAIL STORAGE

CROSS-REFERENCE TO RELATED APPLICATIONS

This application is a continuation of commonly assigned U.S. patent application Ser. No. 10/834,496, filed Apr. 29, 2004, which is hereby incorporated herein by reference.

BACKGROUND OF THE INVENTION

1. Technical Field

The present invention relates in general to improved messaging systems and in particular to improved filing of electronic messages within messaging systems. Still more particularly, the present invention relates providing and managing on-demand email storage space, such that important emails can be stored, rather than discarded, when the pre-determined email storage space is full.

2. Description of the Related Art

The use of electronic mail (email) and other electronic messaging and communications, such as instant messaging, has expanded rapidly over the last few years. Typically, an email application, such as Lotus™ Notes, provides a user interface between the user and an email server that sends and receives email via a network, such as the Internet.

An email server is typically hosted by an Internet Service Provider (ISP) or other entity that hosts email services. Each ISP typically pre-defines the amount of disk space each user is allowed for holding email and attachments. Some ISPs will provide free email service, with minimal disk space, but accessibility from any computer system. Other ISPs may charge a monthly fee for email access. Further still, some ISPs may provide sufficient disk space, but are accessible only from a system logged into an Intranet.

Regardless of the disk space allowed, when a user's disk space is full, ISPs begin to toss emails, rather than store emails for the intended recipient. To free disk space, users must monitor emails and either transfer emails to a local storage system or delete emails.

Discarding all emails once disk capacity is full is not preferable for many users. In particular, while a user may receive many "junk" emails during the day, the user may also receive many important emails that the user does not want just discarded.

In view of the foregoing, it would be advantageous to provide a method, system, and program, for enabling a mail user to request on-demand storage capacity, when the predetermined email storage space is full, such that incoming emails that are of importance to the user are stored, rather than discarded. Further, it would be advantageous to provide a method, system, and program for managing on-demand storage, such that a user is only billed for the additional storage capacity temporarily received.

SUMMARY OF THE INVENTION

Therefore, the present invention provides improved messaging systems and in particular provides for improved filing of electronic messages within messaging systems. Still more particularly, the present invention provides a method, system, and program for managing on-demand email storage space, such that important emails can be stored, rather than discarded, when the pre-determined email storage space is full.

According to one aspect of the invention, an email service provider allocates a predetermined amount of storage space to an intended recipient. When an email is received for the intended recipient at the email service provider, the email service provider determines whether the predetermined storage space has sufficient capacity for storage of the email. If the predetermined storage space has insufficient capacity for storage of the email, then the email service provider allocates on-demand storage space to the intended recipient. The email service provider then stores the email in the on-demand storage space, such that the email is stored, rather than discarded, when the predetermined storage space reaches full capacity. The email service provider tracks use of on-demand storage space and may charge the intended recipient for the use of on-demand storage space.

According to another aspect of the invention, when the email service provider determines that the predetermined storage space has insufficient capacity for storage of the email, then the email service provider determines whether the intended recipient is registered for the on-demand storage space. If the intended recipient is registered for addition of on-demand storage space, then the on-demand storage space is allocated to the intended recipient. However, if the intended recipient is not registered for the on-demand storage space, then the email service provider discards the email.

According to yet another aspect of the invention, when the email service provider determines that the predetermined storage space has insufficient capacity for storage of the email, then the email service provider determines whether the characteristics of the email matches with criteria set by the intended recipient for use of on-demand storage space. The criteria may include, an email identifier, a domain name, an email size, and a keyword, for example. If the characteristics of the email match the criteria, then the email service provider allocates the on-demand storage space to the intended recipient. If the characteristics of the email do not match the criteria, then the email service provider discards the email.

Following, an intended recipient, or email subscriber, is prompted through a user interface to select whether to access on-demand storage space when the predetermined storage space is full. If the intended recipient selects to access on-demand storage space, then the intended recipient is also prompted to select criteria to determine which emails are important enough to the intended recipient that on-demand storage space should be allocated. The on-demand storage space selection and criteria selections are stored by the mail service provider such that when the intended recipient predetermined storage space has insufficient capacity for storage of an email, the email service provider is enabled to determined whether to allocate on-demand storage space for the particular email.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 depicts a distributed network system for facilitating distribution of electronic messages between a sender and a recipient through an email service provider;

FIG. 3 depicts a block diagram of an email service provider server in accordance with the method, system, and program of the present invention;

FIG. 4 depicts an example of types of information included in recipient on-demand criteria;

FIG. 5 depicts an example of entries in an on-demand charges database;

DETAILED DESCRIPTION OF THE PREFERRED EMBODIMENT

Figure 1:
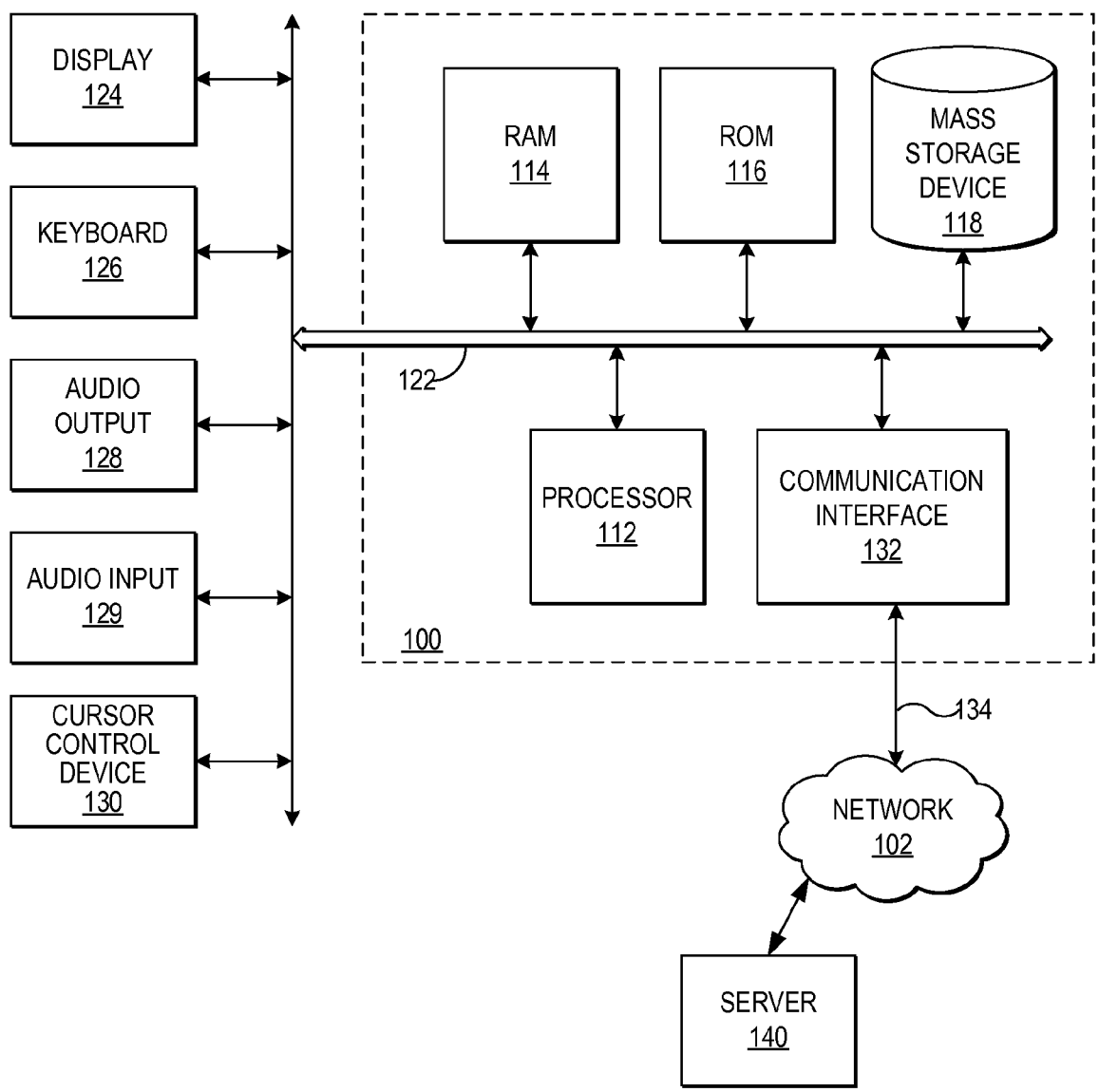
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowchart of FIG. 8, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

With reference now to FIG. 2, a block diagram depicts a distributed network system for facilitating distribution of electronic messages between a sender and a recipient through an email service provider. Distributed data processing system 200 is a network of computers in which one embodiment of the invention may be implemented. It will be understood that the present invention may be implemented in other embodiments of systems enabled to communicate via a connection.

In the embodiment, distributed data processing system 200 contains network 102, which is the medium used to provide communications links between various devices and computers connected together within distributed data processing system 200. Network 102 may include permanent connections such as wire or fiber optics cables, temporary connections made through telephone connections and wireless transmission connections.

In the depicted example, email service provider server 204 is connected to network 102. In addition, client systems, herein termed as sender system 208 and recipient system 210, are connected to network 102 and provide a user interface through input/output (I/O) devices. Email service provider server 204 may facilitate electronic messaging systems through which sender system 208 and recipient system 210 communicate through messaging applications, such as a mail reader, located on sender system 208 and recipient system 210. Messaging applications residing on sender system 208 and recipient system 210 provide an interface for implementing messaging services on sender system 208 and recipient system 210. Further, distributed data processing system 200 may include additional servers, clients, and other devices not shown. For example, electronic messages may be sent and received between email service provider server 204 and other servers (not shown) to distribute and receive messages from sender system 208, recipient system 210, and other clients (not shown).

The client/server environment of distributed data processing system 200 is implemented within many network architectures. In one example, distributed data processing system 100 is the Internet with network 102 representing a worldwide collection of networks and gateways that use the TCP/IP suite of protocols to communicate with one another. The Internet is enabled by millions of high-speed data communication lines between major nodes or host computers. In another example, distributed data processing system 200 is implemented as an intranet, a local area network (LAN), or a wide area network (WAN). Moreover, distributed data processing system 200 may be implemented in networks employing alternatives to a traditional client/server environment, such as a grid computing environment.

Within distributed data processing system 200, each of client systems 208 and 210 and email service provider server 204 may function as both a "client" and a "server" and may be implemented utilizing a computer system such as computer system 100 of FIG. 1. Further, while the present invention is described with emphasis upon email service provider server 204 facilitating the transfer of electronic messages, the present invention may also be performed by clients 208 and 210 engaged in peer-to-peer network communications and downloading via network 102.

According to one embodiment, sender system 208 sends an email intended for the recipient at recipient system 210. The email is directed through network 102 to email service provider server 204, where email service provider server 204 facilitates the email service for the registered recipient at recipient system 210. Email service provider server preferably allocates a predetermined amount of storage space each registered recipient for storing emails. Recipient system 210 preferably connects to email service provider server 204 and periodically requests copies of the email stored for the recipient by email service provider server 204.

When the storage space for a registered recipient has insufficient capacity to store a new email, email service provider service 204 may allocate on-demand messaging storage space to the registered recipient for storage of the new email. Otherwise, email service provider server 204 will discard the message.

In addition to registering for email service, recipients preferably register with email service provider server 204 to receive the on-demand email storage service. Email service provider server 204 may implement recipient system 210 as a user interface for prompting registration for the on-demand email storage service. Alternatively, a system administrator or automated system may register a recipient for the on-demand email storage service.

In addition, when an intended recipient registers for the on-demand email storage service, the intended recipient may also be prompted to select criteria that will specify the types of email that are important to the intended recipient for on-demand messaging storage. An intended recipient is also preferably provided with the cost per use of on-demand messaging storage.

Advantageously, by email service provider server 204 allowing registered recipients to pre-select on-demand storage service, email service provider server 204 is enabled to increase revenue based on user need. Further, advantageously, by email service provider server 204 managing on-demand message storage, registered recipients are provided with the option to ensure that important emails are received even when a pre-determined message storage system is full.

It is important to note that while email service provider server 204 is described with emphasis upon the email service provided, email service provider server 204 may also serve as a general ISP or other type of service provider. In addition, it is important to note that while the present invention is described with emphasis upon email storage or discarding, other types of electronic messages may also be stored in on-demand storage when a mailbox capacity for storing electronic messages is full. Further, it is important to note that email includes the header, text, and any attachments associated with an email.

Referring now to FIG. 3, there is depicted a block diagram of an email service provider server in accordance with the method, system, and program of the present invention. As depicted, email service provider server 204 includes an email storage system 302. Preferably, email storage system 302 includes multiple data storage systems in which email messages intended for registered recipients are stored. The physical storage systems are preferably logically arranged into multiple partitions, where each partition is designated for emails from a different registered recipient. Each registered recipient is preferably assigned a specified size of storage space from email storage system 302. For example, a registered recipient may be assigned 20 MB of storage space for storage of incoming email intended for the registered recipient.

In addition, email service provider server 204 includes an email storage controller 306. Email storage controller 306 detects each new email message received at mail server provider server 204 and parses each new email message to determine the intended registered recipient. Next, email storage controller 306 determines whether the registered recipient storage space has sufficient capacity to store the new email. If the storage space does not have sufficient capacity to store the new email, then email storage controller 306 determines whether the registered recipient has registered for the on-demand messaging storage service. Recipient on-demand criteria 304 designates which registered recipient have specified on-demand service and the criteria for invoking the on-demand service. If the characteristics of the email meet recipient on-demand criteria 304, then email storage controller 306 allocates additional storage space to the registered recipient and stores the email in the additional storage space. In addition, email storage controller 306 updates on-demand charges database 308 with each allocation of on-demand capacity to a registered recipient. Email storage controller 306 discards the email.

With reference now to FIG. 4, there is depicted an example of types of information included in recipient on-demand criteria. As illustrated, recipient on-demand criteria 304 includes multiple types of information. First, a recipient identifier (ID) indicates the registered email address for each recipient. Next, for each recipient ID, a designator of whether the registered recipient has pre-selected the on-demand service is indicated.

The registered recipient may also specify the dates and times for on-demand service. In the example, the date of service is identified as particular days in May, however in alternate embodiments, a registered recipient may specify other time periods, such as a particular day of the week, time of day, or other time period.

A cost per MB of on-demand service negotiated with the registered recipient is also recorded. In addition to a cost per MB, other units of measurement may be negotiated for the cost of on-demand services. It is important to note that when on-demand storage space is allocated to an intended recipient it is preferably temporary storage space such that there may be a cost associated with keeping the on-demand storage space after the email stored therein is read or other criteria.

The registered recipient may specify characteristics of emails for which on-demand capacity should be added. In the example, sender addresses, sender domains, and topics (re:) for which on-demand capacity should be added are specified. It will be understood that other email characteristics may be specified. For example, a user may specify a maximum size of an attachment or specify that the email, but not the attachment, should be stored when on-demand capacity is allocated for the email.

Referring now to FIG. 5, there is depicted an example of entries in an on-demand charges database. As depicted, examples of entries for recipient "janemore" in on-demand charges database 308 specify the characteristic satisfied for the on-demand charge and the cost of the charge. In addition, a total cost for on-demand capacity for the registered recipient is depicted. It will be understood that additional information may be recorded for each on-demand charge including, but not limited to, date of receipt, size of email, and other characteristics.

Figure 6:
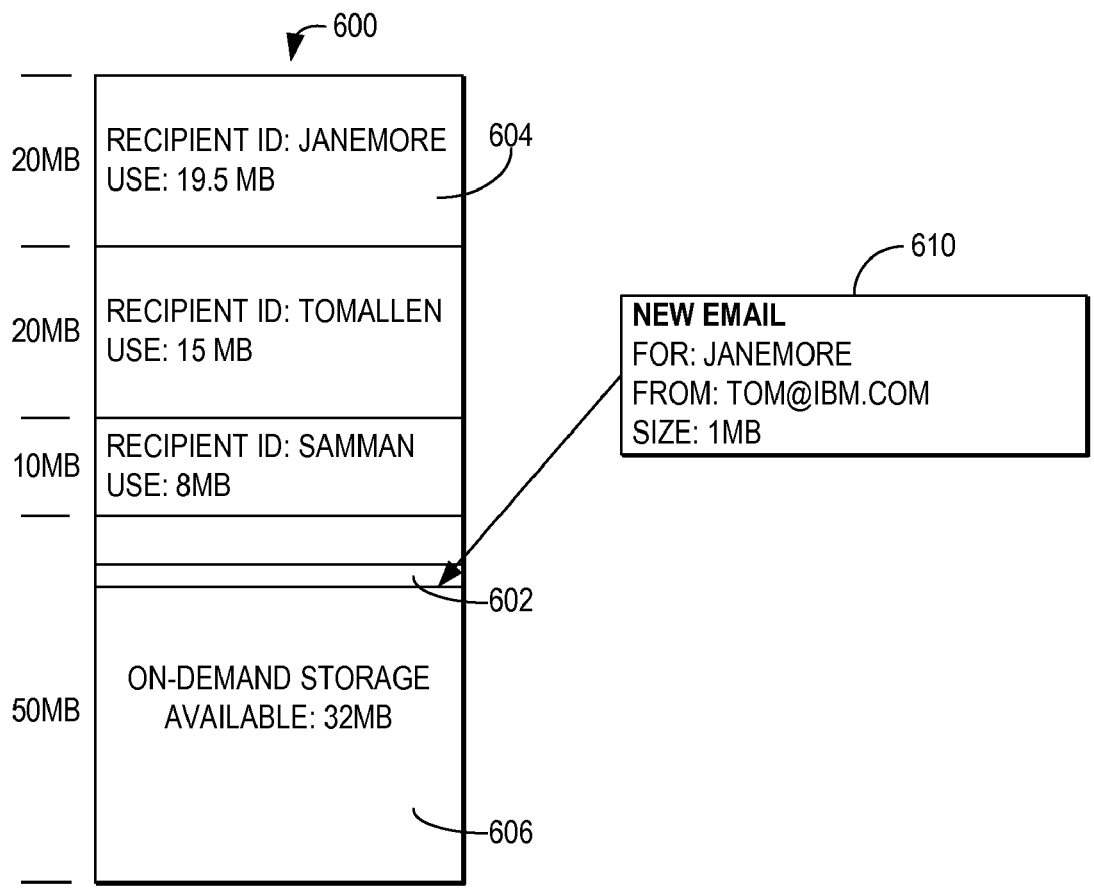
FIG. 6 depicts a pictorial representation of an email storage system with on-demand storage capacity in accordance with the method, system, and program of the present invention.

With reference now to FIG. 6, there is depicted a pictorial representation of an email storage system with on-demand storage available in accordance with the method, system, and program of the present invention. As depicted, a storage volume 600 is partitioned into specific sizes of disk storage space for each recipient. For example, recipient "janemore" and recipient "tomallen" are each allocated 20 MB of storage space and actually use 19.5 MB and 15 MB respectively. Recipient "samman" is allocated 8 MB of storage space. Further, 50 MB of storage space are available for on-demand allocation. It will be understood that each recipient may receive a different amount of disk storage space.

In the example, a new email 610 is received for recipient "janemore". Predetermined storage space 604 for "janemore" only has 0.5 MB remaining. Since new email 610 is 1 MB in size, predetermined storage space 604 has insufficient capacity for storage of new email 610. Referring to recipient on-demand criteria 304 of FIG. 4, recipient "janemore" is registered for on-demand message storage. Next, when the characteristics of new email 610 are compared with recipient on-demand criteria 304, the sender domain of new email 610 matches a recipient specified sender domain in criteria 304. As a result, the email storage controller preferably allocates 1 MB of disk space from on-demand storage 606 to recipient "janemore" as indicated at reference numeral 602. Then, new email 610 is stored in the allocated on-demand storage indicated at reference numeral 602. Although not depicted, the disk space allocated at reference numeral 602 may be added to a logical partition of storage space allocated to recipient "janemore".

It is important to note that on-demand storage 606 may be storage space specifically designated for on-demand requests. Alternatively, on-demand storage 606 may be the storage space not currently used by intended recipients to whom it is allocated. Further, on-demand storage 606 may be accessed from other storage systems accessible via a network or from a dedicated on-demand storage system.

Figure 7:
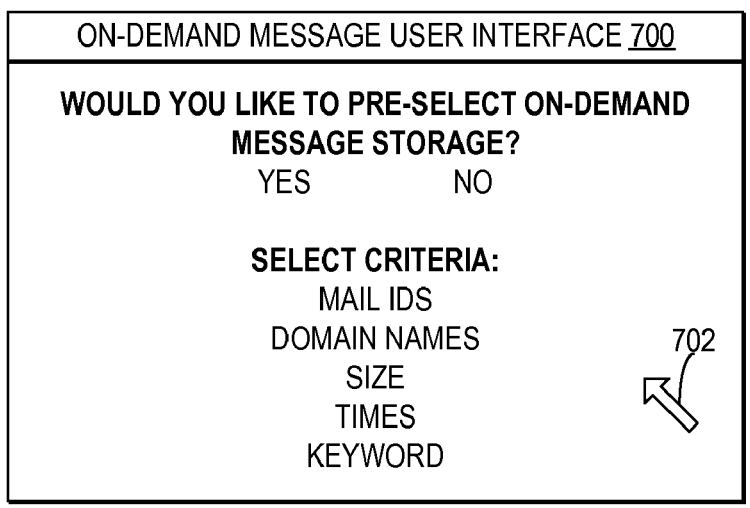
FIG. 7 depicts a graphical user interface for prompting a registered recipient to register for on-demand message storage services.

Referring now to FIG. 7, there is depicted a graphical user interface for prompting a registered recipient to register for on-demand message storage services in accordance with the method, system, and program of the present invention. As depicted, an on-demand message user interface 700 is a graphical user interface which may be displayed on a display device, such as display device 124 of FIG. 1. In the example interface, a user may make selections with an input device, such as cursor 702, through which a user may select "yes" to pre-select the on-demand message storage service and may select to specify criteria such as mail identifiers (IDs), domain names, email size, times, and keywords.

Figure 8:
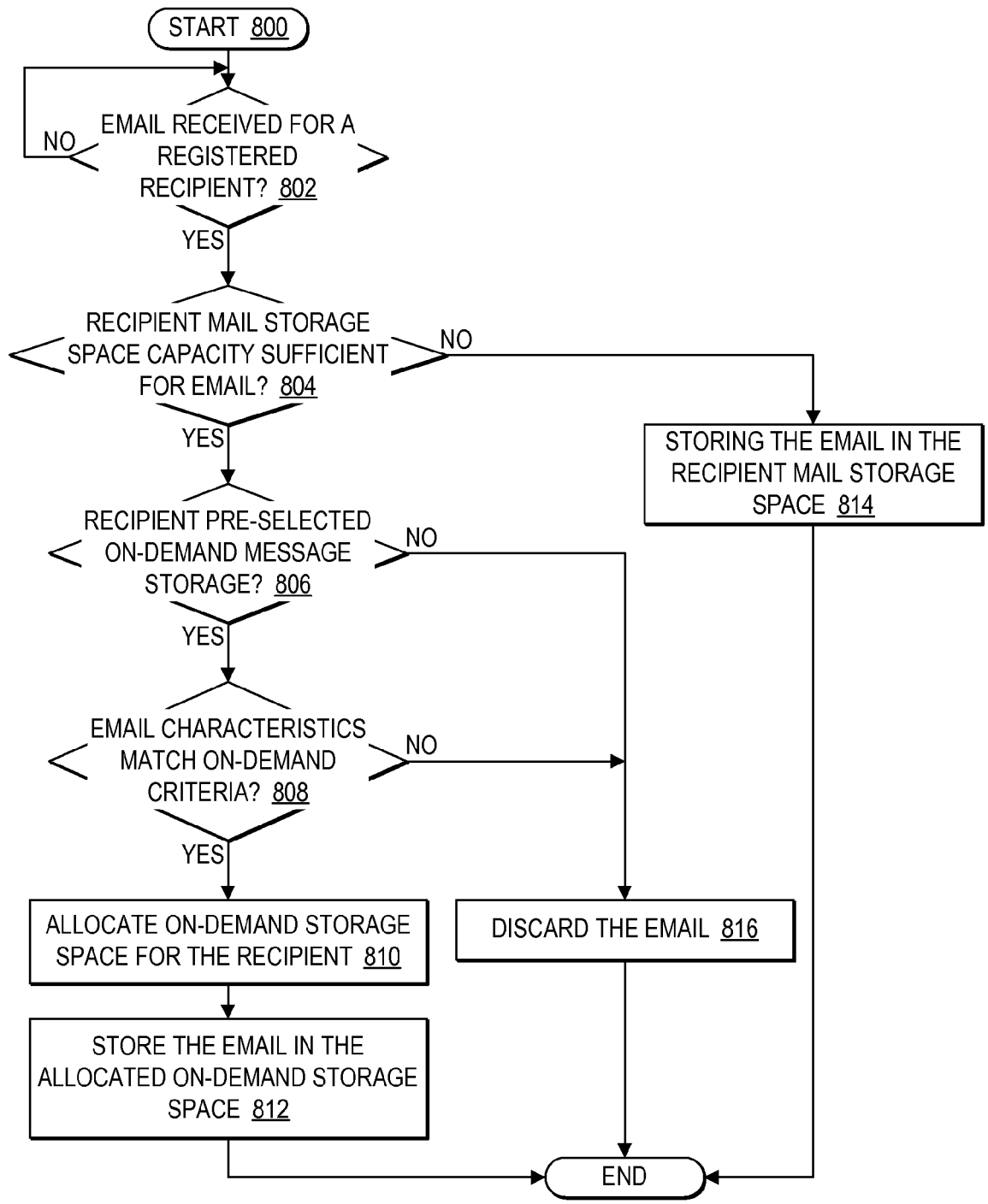
FIG. 8 depicts a high level logical flowchart of a process and program for managing on-demand email storage in accordance with the method, system, and program of the present invention.

With reference now to FIG. 8, there is depicted a high level logical flowchart of a process and program for managing on-demand email storage in accordance with the method, system, and program of the present invention. As depicted, the process starts at block 800 and thereafter proceeds to block 802. Block 802 depicts a determination whether a new email is received for a registered recipient. If a new email is not received for a registered recipient, then the process iterates at block 802. If a new email is received for a registered recipient, then the process passes to block 804. Block 804 depicts a determination whether the recipient's mail storage space has capacity sufficient for storing the email. If the recipient's storage space has sufficient capacity, then the process passes to block 814. Block 814 depicts storing the email in the recipient mail storage space, and the process ends.

Returning to block 804, if the recipient's mailbox capacity is not sufficient for storing the email, then the process passes to block 806. Block 806 depicts a determination whether the recipient has pre-selected on-demand message storage. If the recipient has not pre-selected on-demand message storage, then the process passes to block 816. Block 816 depicts discarding the email, and the process ends. Otherwise, at block 806, if the recipient has pre-selected on-demand message storage, then the process passes to block 808. Block 808 depicts a determination whether the email characteristics match the on-demand criteria set by the recipient. If the email characteristics do not match the on-demand criteria, then the process passes to block 816 and the email is discarded. If the email characteristics do match the on-demand criteria, then the process passes to block 810. Block 810 depicts allocating on-demand storage space for the recipient. Next, block 812 depicts storing the email in the allocated on-demand storage space, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for managing on-demand email storage, comprising:

an email service provider system communicatively connected to a network, wherein a predetermined storage space of a specified size is allocated to said intended recipient by said email service provider system;

said email service provider system further comprising:

means for receiving an email for an intended recipient at an email service provider;

means for determining whether said predetermined storage space has sufficient capacity for storage of said email;

means, responsive to determining said predetermined storage space has insufficient capacity for storage of said email, determining whether said email matches with criteria set by said intended recipient specifying a domain name in a sender address for addition of said on-demand storage space;

means, responsive to a particular sender address in said email matching said domain name in said sender address specified in said criteria, for allocating by said email service provider on-demand storage space to a total storage space allocated to said intended recipient comprising said predetermined storage space and said on-demand storage space and for storing said email in said allocated on-demand storage space, such that said email is stored, rather than discarded, when said predetermined storage space reaches full capacity; and means, responsive to said particular sender address in said email not matching said domain name in said sender address specified in said criteria, for discarding said email.

2. The system according to claim 1 for managing on-demand email storage, wherein said means for allocating by said email service provider on-demand storage space to a total storage space allocated to said intended recipient comprising said predetermined storage space and said on-demand storage space further comprises:

means for determining, responsive to determining said predetermined storage space has insufficient capacity for storage of said email, whether said intended recipient is registered for said on-demand storage space;

means, responsive to determining said intended recipient is registered for said on-demand storage space, for allocating on-demand storage space to said intended recipient; and means, responsive to determining said intended recipient is not registered for said on-demand storage space, for discarding said email.

3. The system according to claim 1 for managing on-demand email storage, wherein said criteria comprises at least one from among an email identifier, an email size, and a keyword.

4. The system according to claim 1 for managing on-demand email storage, further comprising:

means for charging said intended recipient for said allocated on-demand storage space.

5. A computer program product, residing on a computer readable medium having stored thereon machine executable instructions used to program a computer system to perform a process, for managing on-demand email storage, said computer program product comprising:

means for enabling receipt of an email for an intended recipient at an email service provider, wherein said email service provider allocates a predetermined storage space of a specified size to said intended recipient;

means for determining whether said predetermined storage space has sufficient capacity for storage of said email;

means, responsive to determining said predetermined storage space has insufficient capacity for storage of said email, for determining whether said email matches with criteria set by said intended recipient specifying a domain name in a sender address for addition of said on-demand storage space;

means, responsive to a particular sender address in said email matching said domain name in said sender address specified in said criteria, for controlling allocation by said email service provider of on-demand storage space to a total storage space allocated to said intended recipient comprising said predetermined storage space and said on-demand storage space and for enabling storage of said email in said allocated on-demand storage space, such that said email is stored, rather than discarded, when said predetermined storage space reaches full capacity; and means, responsive to said particular sender address in said email not matching said domain name in said sender address specified in said criteria, for discarding said email.

6. The computer program product according to claim 5 for managing on-demand email storage, wherein said means for controlling allocation by said email service provider of on-demand storage space to a total storage space allocated to said intended recipient comprising said predetermined storage space and said on-demand storage space further comprises:

means for determining, responsive to determining said predetermined storage space has insufficient capacity for storage of said email, whether said intended recipient is registered for said on-demand storage space;

means, responsive to determining said intended recipient is registered for said on-demand storage space, for controlling allocation of said on-demand storage space to said intended recipient; and means, responsive to determining said intended recipient is not registered for said on-demand storage space, for discarding said email.

7. The computer program product according to claim 5 for managing on-demand email storage, further comprising:

means for charging said intended recipient for said allocated on-demand storage space.

* * * * *